May 10, 1966 C. D. CUPP 3,250,284
DEMAND REGULATOR OF THE SCREW THREAD TYPE
Original Filed Feb. 16, 1962 2 Sheets-Sheet 1
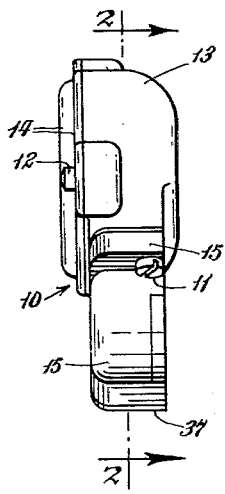
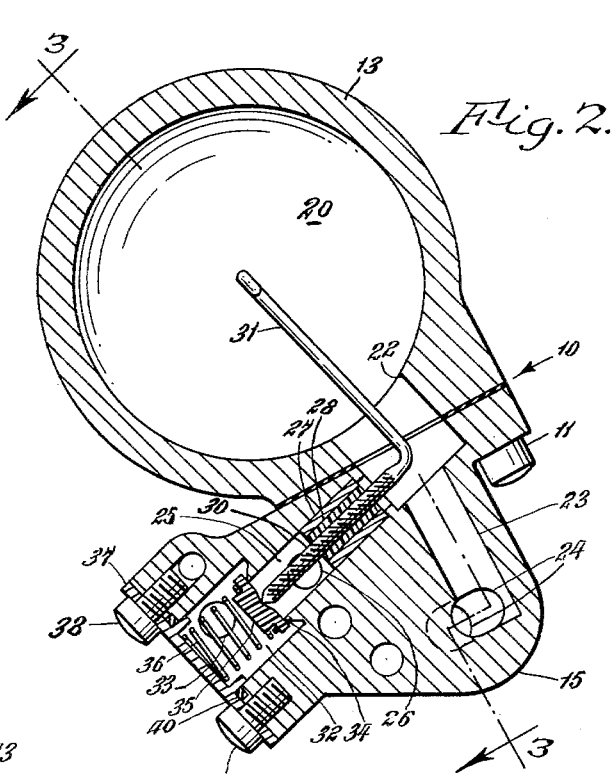
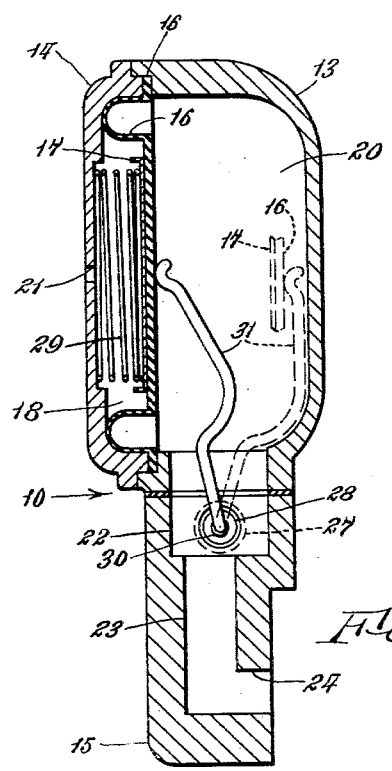
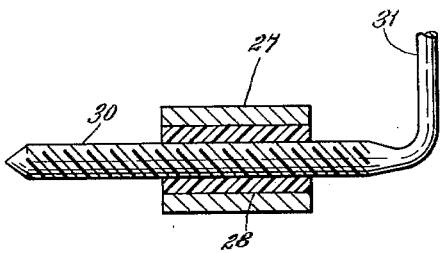
INVENTOR.
Charles D. Cupp
BY
Walter H. Popp.
ATTORNEY.

May 10, 1966  C. D. CUPP  3,250,284
DEMAND REGULATOR OF THE SCREW THREAD TYPE
Original Filed Feb. 16, 1962  2 Sheets-Sheet 2

INVENTOR.
Charles D. Cupp
BY
Walter H. Popp.
ATTORNEY.

3,250,284
DEMAND REGULATOR OF THE SCREW
THREAD TYPE
Charles D. Cupp, Lancaster, N.Y., assignor to Scott Aviation Corporation, Lancaster, N.Y., a corporation of New York
Continuation of application Ser. No. 173,748, Feb. 16, 1962. This application Aug. 4, 1964, Ser. No. 388,748
7 Claims. (Cl. 137—63)

This invention relates to a demand regulator for automatically supplying breathing fluid to a person whenever he inhales. This application is a continuation of my pending application Serial No. 173,748, filed February 16, 1962, for Demand Regulator of the Screw Thread Type and since abandoned.

One object of the invention is to supply breathing fluid in exact accordance with the person's inhalation requirements, irrespective of vibration or of whatever inertia or momentum forces are encountered.

Other objects of the invention and practical solutions thereof are described in detail in the following specification and illustrated in the accompanying drawings, wherein:

FIG. 1 is a diminutive side elevation of one form of the invention;

FIG. 2 is an enlarged, vertical, transverse, section thereof, taken on line 2—2 of FIG. 1;

FIG. 3 is an enlarged, oblique but substantially vertical, longitudinal section thereof, taken on line 3—3 of FIG. 2;

FIG. 4 is a greatly enlarged, fragmentary, detached, sectional view of the thrust screw 30 and the regulator components which are most intimately associated with it;

Figure 5:
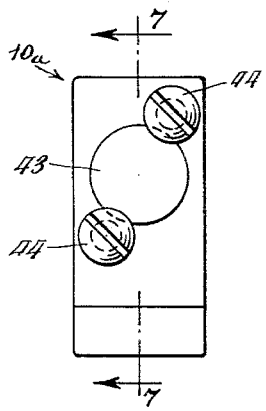
FIG. 5 is an end elevation of a modified form of the invention.

This invention will be described exactly as it is here illustrated, for expediency, but it is to be understood that the legal scope of this invention is only to be measured or limited by its inherent ingenuity and by the breadth of the appended claims.

*FIGS. 1 through 4*

The casing 10 of the regulator consists of three aluminum sections secured together by cap screws 11 and 12, namely: a breathing compartment section 13, a cover 14 and a valve section 15. A rubber diaphragm 16 is clamped between the breathing compartment section 13 and the cover 14 by the cap screws 12 and, together with its metal stiffening disk 17, divides the upper hollow part of the casing 10 into an ambient compartment 18 and a breathing compartment 20, the former of which is open to the ambient atmosphere through an ambient hole 21. The breathing compartment 20 is tubularly connected to either a breathing mask (not shown) or a breathing mouthpiece (not shown) through lateral ducts 22 and 23 and a "sensing" duct 24, thereby maintaining the pressure in said breathing compartment 20 identically the same as that in said mask or mouthpiece.

Drilled up into the valve section 15 of the casing 10 is an outlet chamber 25 having an outlet duct 26, the latter being customarily connected to the "spray bars" of the mask so as to force high pressure breathing fluid across the inner faces of its lenses (not shown) so as to prevent fogging or steaming of said lenses. Received within the cylindrical bore of said outlet chamber is a metal tube 27 within the bore of which is cemented an internally-threaded, nylon sleeve 28, the internal threads of which have a very steep pitch (approximately 45°). Threaded into these internal threads of said nylon sleeve is a demand screw 30 whose inner end is integrally connected with a torque arm 31, the distal end of which bears slidably against and is actuated by the diaphragm 16 and its stiffening disk 17. A compression spring 29 arranged between the cover 14 and the metal stiffening disk 17 makes this demand regulator a positive-pressure demand regulator.

Below the outlet chamber 25 and positioned coaxially relative thereto is a drilled enlargement constituting a cylindrical inlet chamber 32 which is supplied with high pressure breathing fluid through a supply duct 33. Between said inlet chamber 32 and the outlet chamber 25 is an enlarged shoulder which functions as an annular, downwardly-projecting, valve seat 34. A disk shaped demand valve 35 is yieldingly urged upwardly against said valve seat 34 by a light compression spring 36 which bears at its lower end against a closure plate 37 that is held in place by cap screws 38 and rendered leakproof by an O ring 40.

*Operation*

When the person who is using the breathing apparatus inhales, the pressure in the breathing compartment 20 is lowered because it is tubularly connected through the "sensing" duct 24 with the mask (not shown) which the person is wearing. This causes the diaphragm 16 to move inwardly and to push against the distal end of the torque arm 31. This partially rotates the demand screw 30 and opens the demand valve 35 against the pressure in the inlet chamber 32 and also against the light pressure of the compression spring 36. This allows high pressure breathing fluid to flow from the demand valve 35 into the outlet chamber 25 and thence out through the outlet duct 26 and into the "spray bar" (not shown) of the face mask (not shown).

Figure 6:
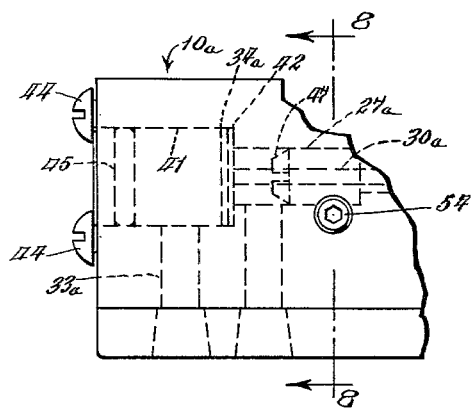
FIG. 6 is a fragmentary, side elevation thereof.
Figure 7:
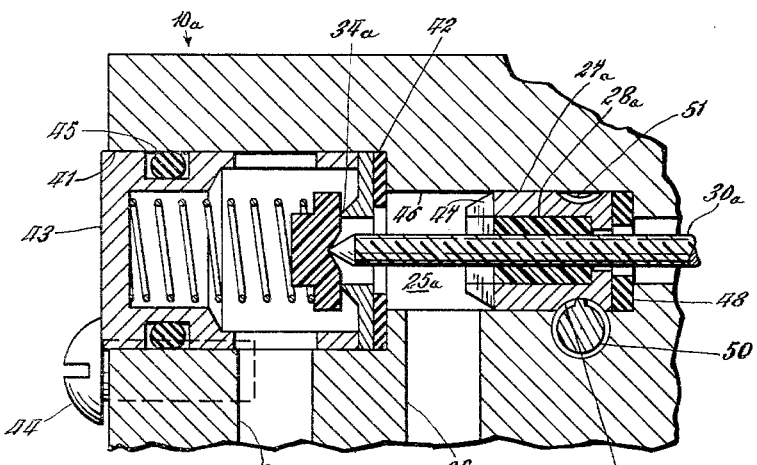
FIG. 7 is a fragmentary, enlarged, vertical, longitudinal section thereof, taken on line 7—7 of FIG. 5.
Figure 8:
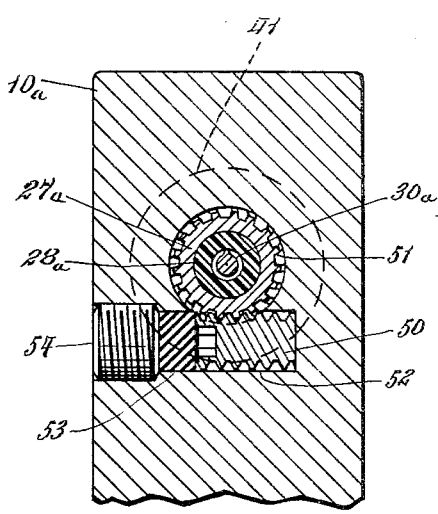
FIG. 8 is a fragmentary, enlarged vertical, transverse section thereof, taken on line 8—8 of FIG. 6.

*FIGS. 5 through 8*

This is a refined modification of the invention. In this construction, the demand valve seat $34_a$ is machined as a separate component part and is positioned at the bottom of a bore 41 against a washer 42 and held in this position by a hollow valve-sleeve 43 that is locked in position by a pair of round-headed cap screws 44. Hermetic sealing between the valve sleeve 43 and the casing $10_a$ is provided by an O ring 45. In this modified construction, the supply duct is $33_a$ and the outlet duct is $26_a$.

Within the bore 46 which forms the outlet chamber $25_a$ is arranged a metal tube $27_a$, and in the bore of the latter is cemented a nylon sleeve $28_a$ which is in threaded engagement with the demand screw $30_a$. A rough rotary adjustment of said metal tube $27_a$, relatively to the demand screw $30_a$, is effected by employing the screw driver slot 47 to screw said tube $27_a$ on said demand screw $30_a$ to approximately the correct position, and also to compress the rubber washer 48 for reasons presently to be explained.

Fine adjustment of the demand screw $30_a$, relatively to the casing $10_a$, is effected by adjusting a worm 50 which engages an annular row of wormwheel teeth 51 that are formed on the periphery of the metal tube $27_a$. By thus rotating said metal tube in the one or other direction, the longitudinal position of the demand screw $30_a$ relatively to the casing $10_a$ is effected.

To enable the worm 50 to be pushed into place, the metal tube $27_a$ is first screwed down tightly on the demand screw $30_a$ by employing the screw driver slot 47. This both aligns the worm-wheel teeth 51 with the bore 52 in which the worm 50 is to be received, and also compresses the washer 48. The latter action is desirable in that it causes friction between the worm-gear teeth 51 and the worm 50 when the latter has been assembled and adjusted. This friction prevents the adjustment of said worm from being disturbed while the regulator is in use.

After the adjustment of the worm 50 has been made, its bore 52 is rendered leakproof by inserting a stiff, putty-like sealant 53 and plugging the tapped hole with a suitable set-screwlike, externally-threaded, metal plug 54.

I claim:

1. A demand regulator adapted to supply breathing fluid to a breathing apparatus upon inhalation by a person using the apparatus comprising a casing having a breathing compartment and a valve section, a diaphragm mounted in said casing and forming a wall of said compartment, said diaphragm being responsive to the pressure in said compartment, a breathing fluid outlet chamber in said valve section, a breathing fluid inlet chamber in said valve section, fluid flow control means including a valve mounted in said section between said chambers for controlling the passage of breathing fluid from said inlet chamber to said outlet chamber, said valve opening into said inlet chamber against the pressure of breathing fluid therein, and a demand screw mounted to open said valve upon rotation of said screw, said demand screw having a lateral arm actuated by movement of said diaphragm to rotate said screw in one direction and thereby open said valve, said lateral arm having abutting contact with said diaphragm, and said screw being urged sufficiently to effect rotation in the opposite direction by the pressure against said valve when released by said diaphragm.

2. A demand regulator adapted to supply breathing fluid to a breathing apparatus upon inhalation by a person using the apparatus comprising a casing having a breathing compartment, a diaphragm mounted in said casing and forming a wall of said compartment, said diaphragm being responsive to the pressure in said compartment, a breathing fluid inlet chamber, a breathing fluid outlet chamber, a demand valve interposed between said chambers for controlling the passage of breathing fluid from said inlet chamber to said outlet chamber, said valve opening into said inlet chamber, and a demand screw operable upon rotation in one direction to open said valve, said screw having an arm actuated by said diaphragm to rotate said screw in said one direction and thereby open said valve against the fluid pressure in said inlet chamber, said arm having abutting contact with said diaphragm and said screw having a steep pitch such that said screw is rotated in the opposite direction by pressure acting on said valve when released by said diaphragm.

3. A demand regulator adapted to supply breathing fluid to a breathing apparatus upon inhalation by a person using the apparatus comprising a casing having a breathing compartment, a diaphragm mounted in said casing and forming a wall of said compartment, said diaphragm being movable in response to variations in pressure in said compartment, a breathing fluid inlet chamber in said casing, a breathing fluid outlet chamber in said casing, a demand valve opening into said inlet chamber and controlling fluid flow from said inlet chamber to said outlet chamber, and a multiple thread demand screw operable to open said valve upon rotation in one direction, said screw having an arm actuated by said diaphragm to rotate said screw in said one direction and thereby open said valve against the fluid pressure in said chamber, said arm having abutting contact with said diaphragm and said screw having a steep thread pitch and being urged sufficiently to effect rotation in the opposite direction by the pressure against said valve when released by said diaphragm.

4. A demand regulator adapted to supply breathing fluid to a breathing apparatus upon inhalation by a person using the apparatus comprising a casing having a breathing compartment, a diaphragm mounted in said casing and forming a wall of said compartment, said diaphragm being responsive to the pressure in said compartment, breathing fluid inlet and outlet means in said casing, means controlling fluid flow from said inlet to said outlet means including a demand valve interposed therebetween, a threaded sleeve in said casing, a demand screw threaded in said sleeve and operable upon rotation to open said valve, said screw having an arm arranged for actuation by said diaphragm to rotate said screw in said sleeve and thereby open said valve, and means for adjusting the axial position of said screw for a given position of said diaphragm, said last-named means including a worm engaging said sleeve for rotating the same on said screw.

5. A demand regulator as set forth in claim 4, wherein said arm is integral with said screw.

6. A demand regulator as set forth in claim 4, wherein said worm is positioned in a bore in said casing, together with means sealing said worm in said bore after adjustment of said sleeve.

7. A demand regulator as set forth in claim 2, wherein said arm bears slideably against said diaphragm.

References Cited by the Examiner
UNITED STATES PATENTS

| | | | |
|---|---|---|---|
| 2,463,809 | 3/1949 | Sacchini | 251—229 |
| 2,674,829 | 4/1954 | St. Clair | 137—505.42 |
| 2,950,898 | 8/1960 | Voss | 251—214 |
| 2,981,275 | 4/1961 | Young | 137—505.42 X |

FOREIGN PATENTS 216,635  11/1909  Germany.

ISADOR WEIL, Primary Examiner.

M. CARY NELSON, Examiner.

R. GERARD, Assistant Examiner.